United States Patent [19]

Raines

[11] Patent Number: 4,656,068
[45] Date of Patent: Apr. 7, 1987

[54] PELLABLE SEAL PACKAGE

[75] Inventor: Charles D. Raines, Columbus, Ga.

[73] Assignee: Plicon Corporation, Columbus, Ga.

[21] Appl. No.: 750,252

[22] Filed: Jul. 2, 1985

Related U.S. Application Data

[63] Continuation-in-part of Ser. No. 564,831, Dec. 23, 1983, abandoned.

[51] Int. Cl.$^4$ .................................................. B27N 5/02
[52] U.S. Cl. .............................................. 428/35; 206/631; 229/43; 428/515; 428/516; 428/520
[58] Field of Search ............... 428/35, 516, 520, 515; 229/3.5, 43; 206/631

[56] References Cited

U.S. PATENT DOCUMENTS

| | | | |
|---|---|---|---|
| 3,552,638 | 1/1971 | Quackenbush | 229/66 |
| 3,616,898 | 11/1971 | Measle | 206/56 AA |
| 3,712,141 | 1/1973 | Chadha et al. | |
| 3,854,653 | 12/1974 | Engelsberger | |
| 3,995,763 | 12/1976 | Ayres et al. | |
| 4,055,672 | 10/1977 | Hirsch et al. | |
| 4,057,667 | 11/1977 | Wiggins et al. | |
| 4,101,047 | 7/1978 | Geppert et al. | |
| 4,101,711 | 7/1978 | Stillman | |
| 4,109,037 | 8/1978 | Nohara | |
| 4,162,343 | 7/1979 | Wilcox et al. | |
| 4,252,846 | 2/1981 | Romesberg et al. | 428/35 |
| 4,278,738 | 7/1981 | Brax et al. | |
| 4,279,344 | 7/1981 | Holloway, Jr. | 426/122 |
| 4,361,237 | 11/1982 | Heiremans et al. | |
| 4,367,312 | 1/1983 | Bontinck et al. | |
| 4,382,513 | 5/1983 | Schrimer et al. | 206/631 |
| 4,452,842 | 6/1984 | Borges | 229/43 |
| 4,469,754 | 9/1984 | Hoh et al. | |
| 4,589,568 | 5/1986 | Ito et al. | 229/43 |

OTHER PUBLICATIONS

Brochure entitled: "Surlyn 1650 Ionomer Resin" published by the du Pont Company, Wilmington, Delaware (publication date unknown).
Brochure entitled: "Surlyn 1601/1601B Ionomer Resin" publ. by the du Pont Company, Wilmington, Delaware (publication data unknown).
Brochure entitled: "du Pont ACR 0903 Ethylene-Methacrylic Acid Copolymer Resin for Flexible Packaging" published by the du Pont Company, Wilmington, Delaware.
Brochure entitled: "Primacor 1410 Adhesive Polymers for Blown Film" published by the DOW Chemical Company, Midland, Michigan (publication date unknown).
Modern Plastics Encyclopedia, Oct. 1983, vol. 60, No. 10A, 1983-1984, pp. 27, 55-65.
Data sheet (and price list) from the du Pont Company, concerning du Pont's "ELVAX" Ethylene-Vinyl Acetate Copolymer Resins.
Data sheet from Gulf Oil Chemicals Company concerning "Gulf Low Density Polyethylene".
Data sheet from the du Pont Company concerning du Pont's "ELVAX 3128" Ethylene-Vinyl Acetate Copolymer Resin.
Data sheet from the du Pont Company concerning du Pont's "ELVAX 3130" Ethylene-Vinyl Acetate Copolymer Resin.
Data sheet from the du Pont Company concerning du Pont's "ELVAX 3170" Ethylene-Vinyl Acetate Copolymer Resin.
Data sheet from the du Pont Company concerning du Pont's "SURLYN 1601" Ionomer Resin.
Data sheet from the du Pont Company concerning du Pont's "SURLYN 1650" Ionomer Resin.
Data sheet from the du Pont Company concerning du Pont's "ACR 0903" Ethylene-Methacrylic Acid Copolymer Resin.
Data sheet from the Dow Chemical Company Concerning "Dow's EAA Copolymer 455".
Data sheet from the Dow Chemical Company concerning Dow's "Primacor Adhesive 1410".
Data sheet from Gulf Oil Chemicals Company concerning Gulf's Ethylene-Methylacrylate "Poly-eth 2205" and Poly-eth 2255.

Primary Examiner—Edith Buffalow

[57] ABSTRACT

An improved heat sealable, peelable seal package structure having walls defined by sheet members and having a region where a first wall portion overlaps upon a second wall portion. The overlapping portions are heat sealable together but are thereafter separatable by peeling. The surface of such first wall portion is comprised of an ethylene acid copolymer, preferably of the ionomer type, and the surface of such second wall portion is comprised of a polyblend of polyethylene and ethylene vinyl acetate copolymer.

10 Claims, 10 Drawing Figures

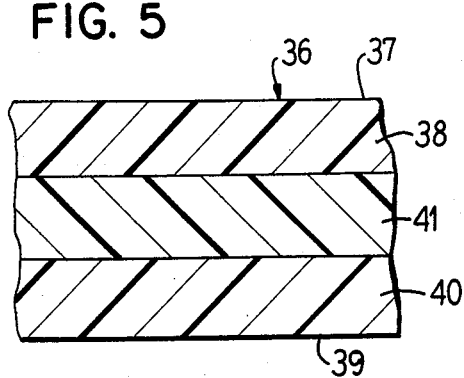
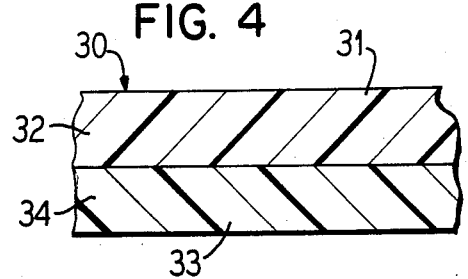
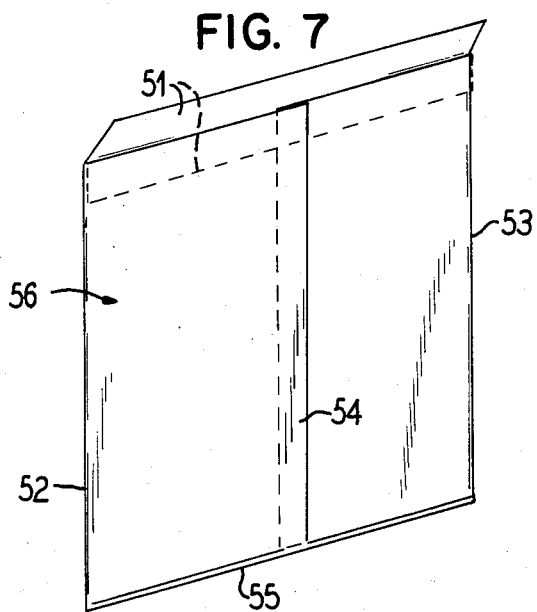
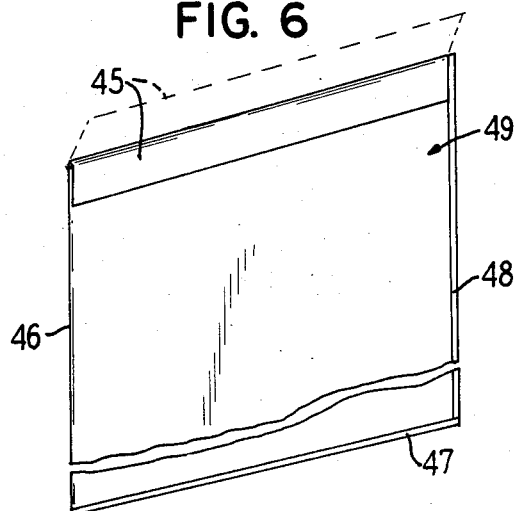
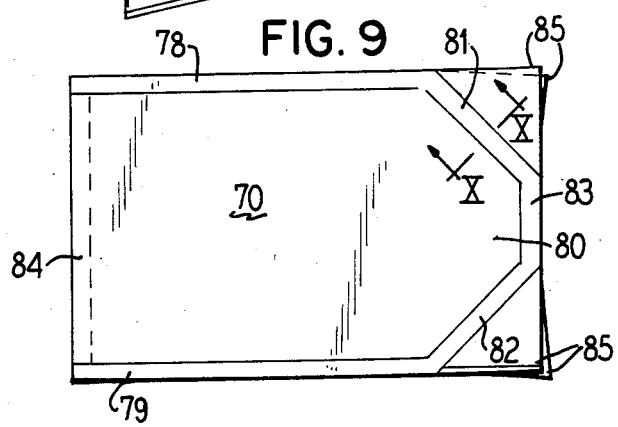
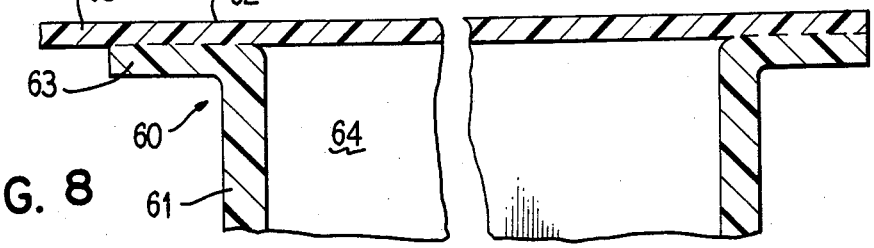

PELLABLE SEAL PACKAGE

RELATED APPLICATION

This application is a continuation-in-part of my earlier filed U.S. patent application Ser. No. 564,831 filed Dec. 23, 1983, now abandoned.

BACKGROUND OF THE INVENTION

In the art of packaging, typically a sealed plastic package must be torn, cut, or otherwise broken into in order to obtain access to the contents thereof.

Particularly in the field of plastic packaging, or of packaging incorporating plastic film, heat sealed interfaces between thermally bondable plastic layers typically are either so tightly fused together as not to be delaminatable or peelable without film rupture, or, alternatively, the film interfacial bonding is so poor as not to provide the required sealing action and seal bond strength required for commercial purposes, particularly in the case of perishable food stuffs.

Particularly, in the latter case, the package wall structure is important so that the provision of an effectively sealed package with a truly peelable seal is difficult to achieve and still have a container which is also adapted for wide spread commercial utilization.

The idea of achieving a peelable seal seemingly has become even more difficult to achieve with the significant commercial usage of packaging films comprised of ethylene acid copolymers (including ionomers) which are characterized, among other properties, with good toughness and outstanding adhesion to a variety of substrates including metals (such as aluminum foil). Particularly in composite (e.g. laminate) structures, ionomer layers commonly serve as heat seal layers which bond well and irreversably to themselves.

It is believed that ethylene acid copolymers (including probably ionomers) have been polyblended with certain other resins and formed into films for the purpose of providing products which would retain the desirable toughness and bonding characteristics of such copolymers and which would also provide peelability for ease in package opening. However, such polyblends appear to suffer from certain disadvantages. For one thing, the resulting polyblend films can have sealing problmes caused by the weakened capacity of such films to form commercially acceptable heat seals with other films. For another thing, it is sometimes difficult to retain the desired toughness properties in the resulting polyblended film. Other problems and disadvantages also exist.

The packaging art needs improved means for producing durable heat seals between ethylene acid copolymer (including ionomer) films and other films and still have the resulting seals be peelable.

BRIEF SUMMARY OF THE INVENTION

The present invention relates to a class of plastic packages for food stuffs and the like having a peelable seal formed by heat sealing.

More particularly, the present invention is directed to a class of containers whose walls are defined by at least one sheet member and which has at least one wall region where a first wall portion overlaps upon a second wall portion in an adjacent relationship. Such first and second wall portions are heat sealable together, yet such can be thereafter separated by peeling at ambient temperatures.

In composition, the surface layer of such first wall portion which is adjacent such second wall portion is comprised of an ethylene acid copolymer, and the surface layer of such second wall portion which is adjacent such first wall portion is comprised of a polyblend which itself is comprised of polyethylene and ethylene vinyl acetate.

In one aspect, such a container of this invention employs a formed product receiving member and a covering film. The receiving member is directly heat bondale to overlapping portions of the covering film around package perimeter regions to provide a gas tight seal of sufficient bond strength for general commercial usage. The so bonded perimeter region between covering film and product receiving member can be separated by manual peeling action when it is desired to open the sealed package. The surface composition of such respective overlapping wall portions are as above defined.

In another aspect such a container of this invention employs a first film comprised of such an ethylene acid copolymer and a second film comprised of such a polyblend of polyethylene and ethylene vinyl acetate. Conveniently, such respective films are heat sealed together about their perimeter regions to define there-between a goods-receiving chamber. The sealed regions are peelable manually.

In another aspect, such a container of this invention employs a single film or sheet consisting of a laminate structure of at least two layers such that the outer layer structure comprising one face thereof is comprised of such an ethylene acid copolymer, and the other layer comprising the opposed face thereof is comprised of such a polyblend of polyethylene and ethylene vinyl acetate. Various container structures using such a laminate sheet structure are possible.

An object of the present invention is to provide an improved peelable seal heat sealed package.

An object of the present invention is to provide an improved heat sealable package with a peelable seal.

A further object is to provide such a package which is particularly well suited for the packing and storage of food products.

A further object is to provide such a peelable seal package for food products and the like wherein interior surfaces of the package are comprised of material which has been previously approved by governmental regulatory agencies for food contact usage.

A further object is to provide a package structure whose walls are comprised of sheet means whose surfaces are formed of continuously extending layers of plastic, one such layer being comprised of an ionomer another such layer being comprised of a polyblend as indicated above which is peelably heat sealable to such ionomer layer.

Other and further aims, objects, purposes, advantages, uses, and the like for the present invention will be apparent to those skilled in the art from the present invention.

BRIEF DESCRIPTION OF DRAWINGS

In the drawings:

FIG. 4 is a diagrammatic vertical sectional view through one embodiment of a two-layered laminate structure suitable for use in making container structures of the present invention;

FIG. 5 is a view similar to FIG. 4, but showing an embodiment of a three-layered such laminate structure;

FIG. 6 is a perspective view of one embodiment of a container structure of this invention which is formed from a laminate of FIG. 4 or of FIG. 5;

FIG. 7 is a perspective view of another embodiment of a container structure of this invention which is formed from a laminate of FIG. 4; or of FIG. 5;

FIG. 8 is an enlarged fragmentary view in vertical section through the lip region of an embodiment of another container structure of this invention;

FIG. 9 is a top elevational view of one embodiment of a container structure of this invention which is formed utilizing a laminate structure of FIG. 9; and FIG. 10 is a vertical sectional view of the sealed edge area of the container structure of FIG. 9 taken along the line X—X of FIG. 9 from two different sheet members which are laminated selectively together.

DETAILED DESCRIPTION

Definitions

Figure 1:
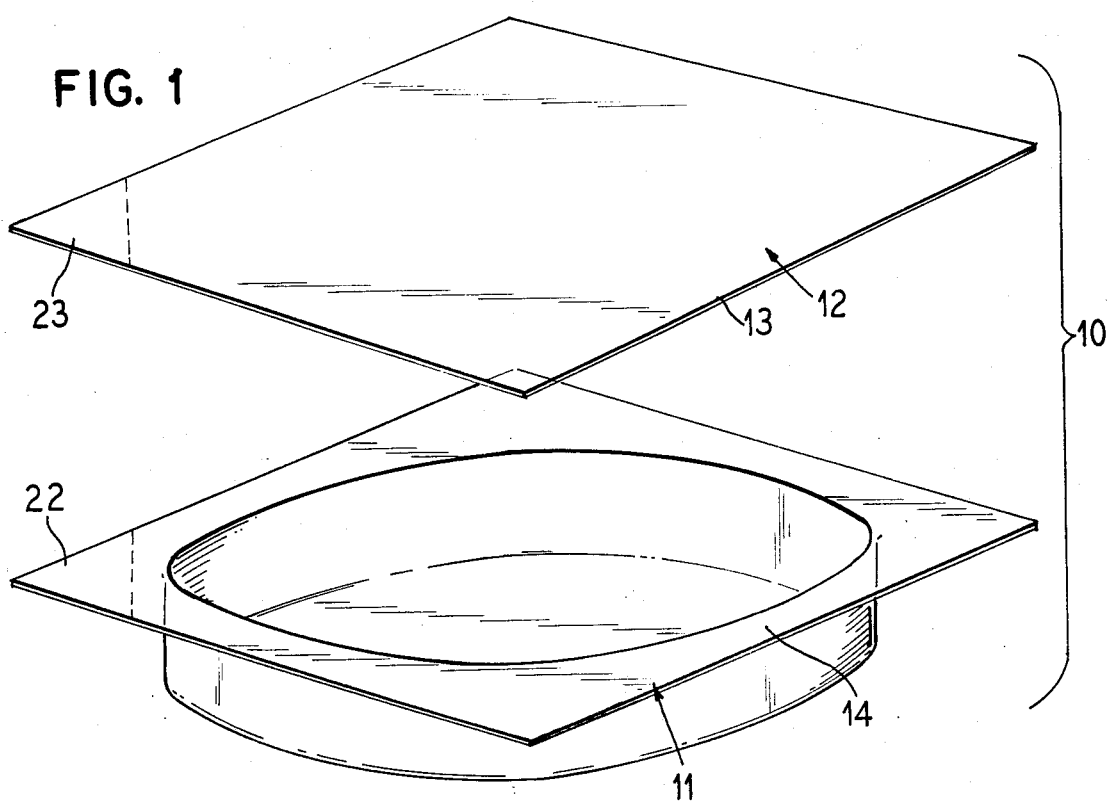
FIG. 1 is an exploded perspective view of one embodiment of the present invention.

By the term "peelable" as used herein in relation to a seal between two plastic film or sheet members reference is generally had to the capacity of a pair of truly sealed together film or sheet members in a face-to-face engagement with one another to separate and to release from such sealed engagement with each other while each retain substantially its original integrity through the application of a separating force which can be manually applied and which is exerted on portions of such members adjacent to the sealed together portion, such force being exerted so as to produce at least a pair of vector components which are opposed to one another in a direction which extends generally normally to the plain of such sealed together portion at the site of the delamination.

By the term "heat sealed" or equivalent as used herein reference is had to a bond formed between two overlapping plastic film or sheet members with heat and pressure applied locally for sufficient time to produce such bond as those skilled in the art will appreciate. Such a bond is gas-tight, and preferably has impact toughness and resistance to separation. The exact or optimum temperature of heat seal formation varies somewhat with the film members being bonded together, as those skilled in the art will appreciate.

Ethylene Acid Copolymer (EAC)

As those skilled in the art appreciate, such a copolymer is produced by the high-pressure polymerization of ethylene and acrylic or methacrylic acid in the presence of free radical initiators. For melt processable applications, the copolymers reportedly contain up to 6.5 wt. % acrylic acid or up to 15 wt. % methacrylic acid. Melt index values reportedly range from about 2.5 to 500 (ASTM D 1238).

The processing conditions used for ethylene-acrylic acid (EAA) or ethylene-methacrylic acid copolymers (EMAA) are generally similar to those used with LPPE.

For direct food contact, EMAA resins should not contain over 20% methacrylic acid and EAA resins should not contain over 10% acrylic acid.

Such copolymer resins are commercially available. For example, an EMAA resin is available from the duPont Company under the trade designation "ACR 0903", while an EAA resin is available from Dow Chemical under the trademark "Primacor 1410."

Ethylene/(meth)acrylic acid copolymers in the form of sodium or zinc salts are sometimes known as "ionomers", as those skilled in the art appreciate. In heavier gauges, ionomer is used in skin packaging for heavy, high valued electronic and hardware products. In composite structures, ionomer is a heat seal layer, particularly in food packaging. Coextruded ionomer film is used in tear open pouches for pharmaceutical and food packaging. Coextruded or laminated ionomer/nylon film is thermoformed to deep draws for meat and drug packages.

Ionomers are commercially available for example, from the duPont Company under trademarks as "Surlyn 1650" and "Surlyn 1601", and "Surlyn 1601B".

Polyblend of PE and EVA

Conveniently, the PE/EVA polyblend compositions employed in this invention are comprised of from about 99 to 67 weight percent of polyethylene, and correspondingly, from about 1 to 33 weight percent of ethylene vinyl acetate on a 100 weight percent polyblend basis, and preferably from about 96 to 82 weight percent of polyethylene and correspondingly from about 4 to 18 weight percent of ethylene vinyl acetate.

A present more preferred embodiment employs such a polyblend which contains about 12 weight percent ethylene/vinyl acetate. Suitable polyblends of ethylene/vinyl acetate and polyethylene are available commercially. Such a polyblend, for example, is commercially available from the duPont Co., under the trademark "Elva 3130".

In composite structures of this invention the bond strength (and consequently the peel force required to separate a heat seal) between an EAC layer and a PE/EVA layer appears to increase with increasing quantities of EVA in the PE/EVA layer, within the compositional ranges herein taught.

Polyethylene (PE) is composed of long chains of the single recurring monomer, ethylene. The polyethylene can be conventionally made and processed for use in this invention.

Ethylene-vinyl acetate (EVA) copolymer resins are derived from basic low density polyethylene (LDPE) technology and comprise a family of thermoplastic polymers containing from about 5 to 50% by weight of vinyl acetate incorporated into an ethylene chain of from about 50 to 95% by weight of ethylene.

Processing of EVA is similar to that of low density polyethylene (LDPE), although a 50° to 100° F. lower temperature normally is used.

Preferably the vinyl acetate content of EVA is in the 5 to 20 weight percent range, with the corresponding balance up to 100 weight percent being ethylene, since higher vinyl acetate contents apparently tend to be too tacky and soft for blown film in the polyblends with PE preferably used in this invention.

The polyblends of PE/EVA can be conventionally made and processed into film, coextruded and laminated.

Figure 2:
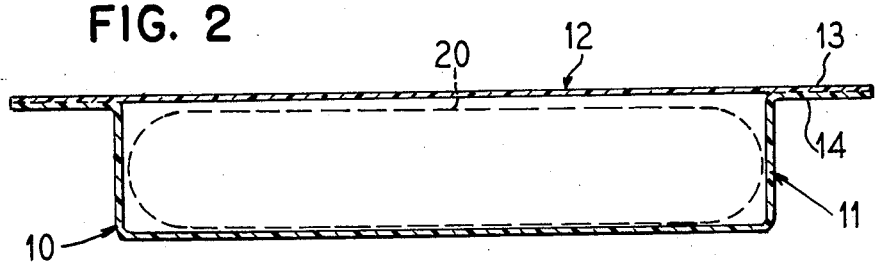
FIG. 2 is a vertical sectional view of an assembled sealed form of the package embodiment shown in FIG. 1.

Referring to FIGS. 1 and 2, there is seen one embodiment of a package structure of the present invention, such embodiment being herein designated for convenience by the numeral 10. Container 10 is seen to comprise a formed product receiving member 11 and a covering film 12. The configuration of the product receiving member 11 can be in any form desired, as those skilled in the art will appreciate, the shape in any given instance being consistent with the exterior configuration of the product to be housed therein. Similarly, the covering film 12 is configurated so as to have a perimeter 13 which is adapted to be positionable generally in overlying relationship to the perimeter 14 of the product receiving member 11.

Figure 3:
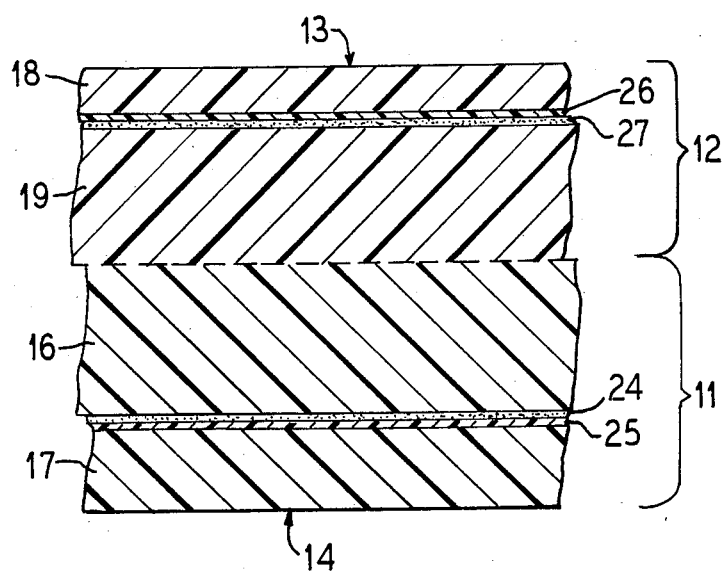
FIG. 3 is an enlarged fragmentary vertical sectional view of the sealed rim area of the container structure shown in FIG. 2.

A preferred product receiving member 11, such as shown, for example, in FIG. 3, is seen to comprise a laminate structure of four mutually interbonded layers. The interior or innermost layer 16 of receiving member 11 is comprised of a layer of a thermoplastic polymeric ionomer such as "Surlyn" which is available from E.I. duPont DeNemours & Co., Wilmington, Delaware. The outermost or exterior layer 17 of the receiving member 11 is comprised of a polyamide. One suitable polyamide polymer for this purpose is available from Allied Corp. under the trademark "Capram 77-K".

Adjacent the layer 17 is a layer 25 of saran, which preferably used to provide an oxygen barrier as when a meat product is to be contained in package 10. A suitable coated film of polyamide and saran is available commercially from Allied Corp. If an oxygen barrier is not needed, then the saran layer can be eliminated.

Adjacent the layer 16 is a layer of polyester adhesive 24 which functions to bond the "Surlyn" ionomer layer 16 to the substrate. The polyester adhesive can be applied to the polyamide or to the saran layer (if the latter is used). One suitable polyester adhesive is available commercially under the trade designation "56065" from duPont Packaging Finishes Co.

As those skilled in the art will readily appreciate, the layer 17 can be conveniently formed initially by extrusion, after which succeeding layers are applied thereto by conventional processing as those skilled in the art will appreciate. After formation, this resulting laminate structure is generally thermoformable and is thermoformed conventionally into any desired dish-shape desired prior to incorporation into a container 10. Conventionally, before being thermoformed, this laminate is termed a forming web, as those skilled in the art will appreciate, since the polyamide layer is chosen so as to be thick enough to permit thermoforming of the entire laminate or forming web. Suitable thermoforming conditions involve temperatures in the range of from about 60° to 180° C., though higher and lower temperatures may be employed, if desired. As illustrated, the internal surface portions of the thermoformed laminate comprising member 11 are thus comprised of the layer of "Surlyn" ionomer while the outer surface portions of such member 11 are comprised of the polyamide layer.

The covering film 12 is generally flexible. Referring also to FIG. 3, film 12 is seen to be a laminate structure having an outer layer 18 comprised of either a polyester (preferably a polyethylene terephthalate) or a polyamide. The thickness of layer 18 is not generally designed for thermoforming capability. The inner layer 19 is a polyblend of a composition comprised of ethylene/vinyl acetate and polyethylene as above described.

The covering film 12 can be prepared by any convenient procedure. Preferably, and as shown in FIG. 3, the outer layer 18 of polyester or polyamide is covered with a layer 26 of saran for oxygen barrier resistance. This layer 26 can have a composition like layer 25 in member 11, and it can be eliminated, if desired.

A layer 27 of polyester adhesive (which can have a composition like layer 24) bonds layer 18 to layer 19. Such adhesive can be used whether or not the saran layer 26 is included. Conventional methods of laminate manufacture known to those skilled in the art may be employed. Preferably, the covering film 12 is used directly as manufactured, although diecutting or similar procedure may be employed to define the perimeter 13 of the covering film 12 so as to match the perimeter 14 of the receiving member 11.

In accordance with the present invention, the ethylene vinyl acetate/polyethylene layer is directly heat bondable to portions of the receiving member 11 adjacent the perimeter 14 thereof after the receiving member 11 has been charged with a fill, such as a ring sausage 20, or the like. Surprisingly and unexpectedly, although the ethylene vinyl acetate/polyethylene layer 19 forms a gas tight bond with the "Surlyn" ionomer layer 16 which is secure for commercial purposes of shipping, storing, and the like, nevertheless, the ethylene vinyl acetate/polyethylene layer 19 can be delaminated from the portions of the "Surlyn" ionomer layer 16 bonded thereto by manual stripping action. For example, a loose flap including the PE/EVA layer 19 provided at corner 23 of film 12 can be grasped between the thumb and forefinger of one hand while an adjacent loose flap portion provided at corner 22 of member 11 including the "Surlyn" ionomer layer 16 can be grasped between the thumb and forefinger of the other hand. When the hands are pulled apart, delamination occurs so that ready access to the fill within the receiving member 11 is obtained. Flap regions for accomplishing delaminating can be in any desired form. As shown, for example, the flap of covering film 12 can merely amount to an unbonded perimeter region (relative to layer 16). Alternatively, a pull tab or corner 22 (shown in phantom lines in FIG. 1) can be provided integrally with the receiving member 11 and another pull tab or corner 23 can be provided in integral association with the covering film 12. In heat sealing the covering film 12 to the receiving member 11, when tabs 22 and 23 are employed, it is preferred to orient the covering film 12 relative to the receiving member 11 so that the tab 23 is in adjacent opposed relationship to the pull tab 22 in the assembled container 10.

EXAMPLE 1 (EMBODIMENT OF FIGS. 1-3

For example, in an embodiment of the container of FIGS. 1-3, the film 12 has a layer 18 with a thickness of 0.75 mils, a layer 19 with a thickness of 2.25 mils, and a layer 26 with a thickness of about 0.1 to 0.15 mils; and the receiving member 11 has a layer 16 with a thickness of 2.50 mils, a layer 17 with a thickness of 1.25 mils, and a layer 25 with a thickness of about 0.1 to 0.15 mils.

Referring to FIG. 4, there is seen a two layered laminate film structure 30 which is suitable for making a container structure of this invention. Laminate 30 has one face 31 thereof provided by a layer 32 comprised of an ethylene acid copolymer as herein described while the opposing face 33 thereof is provided by a layer 34 comprised of a PE/EVA polyblend as herein described.

Referring to FIG. 5 there is seen a three layered laminate film structure 36 which is also suitable for making a container structure of this invention. Laminate 36 has one face 37 thereof provided by a layer 38 comprised of an ethylene acid copolymer as herein described while the opposing face 39 thereof is provided by a layer 40 comprised of a PE/EVA polyblend as herein described. Between the layers 38 and 40 is positioned a mutually interbonded layer 41 comprised of another thermoplastic material, such as a polyamide or the like, the function of such a layer 41 being to improve physical properties of the laminate 36 over the properties of, for example, the laminate 30, thereby to better adapt the laminate 36 for specialized applications, such as for meat packaging or the like. Selection of the particular thermoplastic for layer 41 depends upon the end use application contemplated and other factors.

The laminate structures 30 and 36 can be prepared, if desired, by coextrusion. Alternatively such can be prepared by laminating procedures involving preformed film layers, in which procedure an adhesive layer can additionally be present between adjacent layers to achieve bonding therebetween. Mixed fabrication procedures can be used; for example, an ethylene acid copolymer/polyamide (nylon) laminate can first be coextruded and then a layer of PE/EVA polyblend preformed, can be laminated thereto with a polyester adhesive. The thicknesses of such laminates 30 and 36 is typically not such as to make the laminate rigid enough to be thermoformable.

In place of a thermoplastic material for layer 41, one can employ various other film and sheet materials, such as metal foils, like aluminum, woven and non-woven fabrics (natural or synthetic), cellulosic paper, or the like.

The laminates 30, and 36, or the like, can be used to make various containers of the invention. For example, referring to FIG. 6 there is seen a container embodiment which can be fabricated from a single sheet of either such laminate 30 or 36.

In FIG. 6, a sheet of such a laminate is precut to provide a lip flap 45. The cut sheet is folded in upon itself to form side 46, and adjacent inner, faces thus formed are heat sealed together at their adjoining peripheries to form sides 47 and 48. When the flap 45 is folded over the adjacent outside surface portion of the resulting container 49, a contact between opposing faces 31 and 33 of, the laminate is achieved so that a heat seal between respective surface portions of ethylene acid copolymer and PE/EVA polyblend is achieved to produce a heat sealed joint which, in accord with the principles of this invention, is peelable. Thus, a single starting sheet of such a laminate is used to form a container structure.

In FIG. 7, a sheet of such a laminate is precut to provide a lip flap 51. The cut sheet is folded in upon itself to form folded side edges 52 and 53, respectively, and to provide an overlap in a central region 54 where the outside face is adjacent to the inside face. A heat seal is thus releasably formable between the overlapping faces in region 54. A heat seal is also formed between inside facial portions to provide a sealed side 55. The flap 51, when folded over the resulting adjacent outside surface portions of the thus formed container 56, permits a releasable (peelable) heat seal to be formed.

Referring to FIG. 8, there is seen fragmentarily another embodiment of a container structure of this invention designated in its entirety by the numeral 60. Container 60 can, for example, utilize a heavy gauge sheet 61 (comprised for example, a "Surlyn" polymer) and a similar sheet 62 comprised of PE/EVA polyblend. The sheet 61 is adapted for the skin packaging or heavy high valve electronic and hardware products. The sheet 62 is provided which is adapted to serve as a covering film and is edge configured to overlap upon rim (or lip) portions 63 of the central bag-like cavity 64 utilized for product holding defined in sheet 61. After packing with product, the covering film sheet 62 is positioned over the rim portions 63 and is heat sealed thereto. To open container 60, the sheet 62 is manually peeled away from the sheet 61. A tab 65 is optionally provided for sheet 62 to aid in peeling.

Referring to FIGS. 9 and 10 there is shown another embodiment of a container structure of this invention which is herein designated in its entirety by the numeral 70. Container 70 is formed of two preformed laminate sheet members identified as 71 and 72, respectively, as shown in the fragmentary enlarged view depicted in FIG. 10. Laminate sheet 71 is seen to be comprised of an inner layer 73 comprised of a PE/EVA polyblend and an outer layer 74 bonded thereto comprised of a polyester. Layer 73 can be, for example, about 1.5 mils in thickness while layer 74 can be about 0.5 mil in thickness.

Sheet laminate 72 is seen to be comprised of an inner layer 76 and an outer layer 77 bonded thereto. Inner layer 76 is comprised of "Surlyn" while the outer layer 77 is comprised of polyester. Inner layer 76 is here illustratively about 1.5 mils while outer layer 77 is here illustratively about 0.5 mils, in thickness.

Initially, the container 70 is formed by laminating together the opposed side edges 78 and 79 in the manner shown, for example, in FIG. 9, with the intended top portion 80 of container 70 being defined by the diagonal seals 81 and 82 which extend from their respective side edges 78 and 79 inwardly to define a brief top edge 83 which itself is likewise sealed. Initially, the bottom edge 84 of the container 70 is left unsealed.

Thus, a product or fill is placed into the container 70 through the bottom edge 84 and thereafter the bottom edge is sealed as illustrated by the phantom lines shown in FIG. 9.

The unsealed tabs 85 on the outside of each of the diagonal seals 81 and 82 (which tabs are comprised of the sheet laminates 71 and 72, as will be appreciated), are then available for finger gripping by someone desiring to open the container 70 for reasons of access to the fill therein. The opening can be achieved, in accordance with the present invention, by simply peeling away the opposed surfaces of the sheet laminate 71 from sheet laminate 72 in the region of the seals 81, 82, and 83.

As those skilled in the art will understand, many different film materials can be bonded together by laminating or coextrusion (or the like)to produce laminate sheet constructions wherein a layer of ethylene acid copolymer or a layer of PE/EVA polyblend is on an outside face thereof. Thus, the laminate sheet constructions used as starting materials to make a container of this invention having a peelable seal structure can employ many different film forming thermoplastics. Suitable film forming plastics include acrylonitrile-butadiene-styrene (ABS); acrylonitrile methyl acrylate copolymer, rubber modified; cellulosics, such as cellulose acetate, cellulose tracetate, cellulose acetate butyrate, cellulose propionate, ethyl cellulose and regenerated cellulose (cellophane); fluoroplastics, such as ethylene-chlorotrifluoroethylene copolymer (E-CTFE), ethylene tetrafluoroethylene copolymer (ETFE); fluorinated ethylene propylene copolymer (FEP), perfluoroalkyl (PFA), polychlorotrifluoroethylene copolymers (CTFE), polytetrafluoroethylene (PTFE), polyvinyl fluoride (PVF), and polyvinylidene fluoride (PVDF); polyamides, such as nylon 6 (extruded or biaxially oriented), nylon 11, and nylon 12; polycarbonate; polyester (i.e., thermoplastic polyethylene terephthalate (PET)); polyethylene and ethylene copolymers, such as low density PE, medium density PE, high density PE, ultrahigh molecular weight PE and ethylene vinyl acetate copolymer; polyimide; polymethyl methacrylate, such as standard or type A (korad acrylic); polyethyl pentene; polypropylene, such as extrusion (cast) or biaxially oriented; polystyrene; polysulfone; polyethersulfone; polyurethane elastomer; polyvinyl chloride, such as nonplasticized sheets or films (calendering, extrusion, or solvent cast), or plasticized sheets or films (calendering, extrusion, or solvent cast); vinyl chloride-acetate copolymer (nonplasticized or plasticized); vinylidene chloride-vinyl chloride copolymer; vinyl nitrile rubber alloy; and the like.

In addition, a laminate sheet construction used as starting structures for forming a container of the present invention can employ as one layer thereof paper or metal foil, such as aluminum or copper foil. Ethylene acid copolymer and PE/EVA each bond to paper or metal foil. For example, the layer 41 in the laminate 36 of FIG. 5 can be formed of metal foil or of cellulosic paper or of synthetic woven monofiliment, such as a polyester fabric, or the like as desired.

A peeled seal of polyethylene and ethylene vinyl acetate copolymer layer to ethylene acid copolymer can be reformed, if desired through resealing with heat and pressure applied against such layers. A laminate incorporating a paper or foil layer is not heat formable, as those skilled in the art will readily appreciate.

Although the teachings of my invention have herein been discussed with reference to various specific embodiments, it is to be understood that this is by way of illustration only and that others may wish to utilize my invention in different combinations, designs or applications.

I claim:

1. A heat sealable, peelable seal package having walls defined by sheet members and having at least one region where a first wall portion overlies a second wall portion in adjacent relationship, said overlying portions being heat sealable together and thereafter being separatable by peeling, the surface of said first wall portion so adjacent said second wall portion being comprised of an ethylene acid copolymer, and the surface of said second wall portion so adjacent said first wall portion being comprised of a polyblend of polyethylene and ethylene vinyl acetate copolymer, said polyblend being comprised on a 100 weight percent basis of from about 99 to 67 weight percent of said polyethylene, and, correspondingly, from about 1 to 33 weight percent of said ethylene vinyl acetate copolymer.

2. The package of claim 1 wherein said first wall portion and said second wall portion are each a laminated sheet member comprised of at least two layers.

3. The package of claim 1 wherein said ethylene acid copolymer comprises ethlene/(meth)acrylic acid.

4. The package of claim 3 wherein said ethylene/(meth)acrylic acid copolymer is in the form of a salt selected from the group consisting of sodium and zinc.

5. The package of claim 1 wherein:

(A) said first wall portion consists of a generally dish-shaped relatively rigid formed product receiving member having a central product receiving cavity and a generally outwardly flanged perimeter and wherein the inside surface portions thereof are comprised of a layer of said ethylene acid copolymer, and (B) said second wall portion consists of a generally relatively flexible covering film member having edge portions configured to overlie said flanged perimeter and wherein the inside surface portions thereof are comprised of a layer of said polyblend.

6. The package of claim 1 wherein:

(A) said first wall portion consists of said ethylene acid copolymer, and (B) said second wall portion consists of said polyblend.

7. The package of claim 1 wherein said each of said first and said second wall portions consist of a laminate film structure characterized by having one surface thereof comprised of a layer of said ethylene acid copolymer, and by having the opposed surface thereof comprised of a layer of said polyblend of polyethylene and ethylene vinyl acetate copolymer.

8. A laminate sheet structure for the manufacture of a container having a peelable seal wherein one surface thereof is formed by a layer of ethylene acid copolymer and wherein the opposed surface thereof is formed by a layer of a polyblend of polyethylene and ethylene vinyl acetate copolymer.

9. An improved peelable seal package comprising:

a generally dish-shaped relatively rigid, formed product receiving member having defined therein a central product receiving cavity and a generally outwardly extending flanged perimeter;

a generally relatively flexible covering film member having edge portions configured to overlie said flanged perimeters;

said product receiving member comprising a first multilayered interfacially bonded laminate wherein:

the outer layer thereof is comprised of a polyamide which has sufficient thickness to be thermoformable into a said relatively rigid dish-shaped configuration, an intermediate layer thereof is comprised of a polyester adhesive, and the inner layer thereof is comprised of a surlyn ionomer;

said covering film member comprising a second multilayered interfacially bonded laminate wherein:

the outer layer thereof is comprised of a polymers selected from the class consisting of polyamides and polyesters and has generally insufficient thickness to be thermoformable, an intermediate layer thereof is comprised of a polyester adhesive, and the inner layer thereof is comprised of a polyblend of ethylene vinyl acetate and polyethylene;

said flanged perimeter being heat bondable to said edge portions, the resulting bond being characterized by a capacity to be separated by peeling.

10. The package of claim 9 wherein a layer of a saran polymer is interposed between said outer layer and said polyester adhesive in each of said product receiving member and said covering film member.

* * * * *

UNITED STATES PATENT AND TRADEMARK OFFICE
CERTIFICATE OF CORRECTION

PATENT NO. : 4,656,068
DATED : April 7, 1987
INVENTOR(S) : Charles D. Raines

It is certified that error appears in the above—identified patent and that said Letters Patent is hereby corrected as shown below:

On the face of the patent, the title (Item No. [54]) is identified as PELLABLE SEAL PACKAGE. This should be corrected to read PEELABLE SEAL PACKAGE. Title is also misspelled in Column 1, line 1.

Signed and Sealed this

Tenth Day of November, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,656,068
DATED : April 7, 1987
INVENTOR(S) : Charles D. Raines

It is certified that error appears in the above—identified patent and that said Letters Patent is hereby corrected as shown below:

Column 1, line 47, "problmes" should read --problems--.

Column 2, line 12, "bondale" should read --bondable--.

Column 5, line 50, "enought" should read --enough--.

Column 6, line 51, "(EMBODIMENT OF FIGS. 1-3" should read --(EMBODIMENT OF FIGS. 1-3)--.

Column 9, line 35, "readly" should read --readily--.

Column 10, line 62, "terizied" should read --terized--.

Signed and Sealed this

First Day of March, 1988

Attest:

DONALD J. QUIGG

*Attesting Officer*     *Commissioner of Patents and Trademarks*